US009286195B2

(12) United States Patent
Dermler

(10) Patent No.: US 9,286,195 B2
(45) Date of Patent: Mar. 15, 2016

(54) DERIVATION OF GENERALIZED TEST CASES

(71) Applicant: GLOBALFOUNDRIES INC., Grand Cayman (KY)

(72) Inventor: Gabriel Dermler, Leinfelden-Echterdingen (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 263 days.

(21) Appl. No.: 14/033,762

(22) Filed: Sep. 23, 2013

(65) Prior Publication Data

US 2015/0089290 A1  Mar. 26, 2015

(51) Int. Cl.
G06F 11/00 (2006.01)
G06F 11/36 (2006.01)
G06F 11/22 (2006.01)

(52) U.S. Cl.
CPC ........ G06F 11/3684 (2013.01); G06F 11/2273 (2013.01); G06F 11/368 (2013.01)

(58) Field of Classification Search
CPC ........................ G06F 11/3668–11/3696; G06F 11/22–11/277; G06F 11/2273; G06F 11/368
See application file for complete search history.

(56) References Cited

U.S. PATENT DOCUMENTS

| 6,966,013 | B2 | 11/2005 | Blum et al. |
| 7,478,365 | B2 | 1/2009 | West et al. |
| 2003/0208744 | A1 | 11/2003 | Amir et al. |
| 2003/0233600 | A1* | 12/2003 | Hartman et al. ................. 714/32 |
| 2004/0153837 | A1 | 8/2004 | Preston et al. |
| 2008/0109475 | A1* | 5/2008 | Burmester et al. ............ 707/102 |
| 2009/0271139 | A1* | 10/2009 | Shin .............................. 702/108 |
| 2012/0167059 | A1* | 6/2012 | Kosuda ......................... 717/131 |

FOREIGN PATENT DOCUMENTS

WO      0190897 A2    11/2001

OTHER PUBLICATIONS

The International Search Report dated Nov. 6, 2014 for PCT/EP2014/066470, international filing date Jul. 31, 2014, 11 pages.
Arnicane, "Complexity of Equivalence Class and Boundary Value Testing Methods", Scientific Papers, University of Latvia, 2009, vol. 751, Computer Science and Information Technologies, pp. 80-101.

* cited by examiner

*Primary Examiner* — Jason Bryan
(74) *Attorney, Agent, or Firm* — Scully, Scott, Murphy & Presser, P.C.

(57) ABSTRACT

A first computer receives one or more pre-defined equivalence classes, wherein a pre-defined equivalence class comprises of one or more substantially equivalent values. The first computer receives a plurality of messages transmitted between a second computer and a third computer, wherein each message has at least one parameter and each parameter has at least one corresponding value. The first computer determines one or more parameters have one or more values that match one or more values of a pre-defined equivalence class. The first computer creates one or more value driven equivalence classes, wherein each value driven equivalence class comprises of one or more parameters and wherein each of the one or more parameters in each value driven equivalence class has the same corresponding value. The first computer creates a generalized test case, wherein the generalized test case includes at least the one or more value driven equivalence classes.

12 Claims, 4 Drawing Sheets ns of the test case creation system of FIG. 1, in accordance
DERIVATION OF GENERALIZED TEST CASES

FIELD OF THE INVENTION

The present invention relates generally to test case generation, and more particularly to deriving generalized test cases for use in regression testing.

BACKGROUND

Regression testing involves the repetition of tests developed for a system for the purpose of ensuring correct system behavior and uncovering any software bugs or regressions in existing functional and non-functional areas of the system. Typically, regression testing is performed after changes, such as enhancements, patches, or configuration changes have been made to the system. The intent of regression testing is to ensure that the changes made to the system have not introduced new faults or bugs to the system. Regression testing can be used to not only test for the correctness of a program, but also for tracking the quality of its output.

When developing regression tests for a client/server system, testing the server APIs (application programming interfaces) constitutes a significant part. Test clients are programmed to interact with the server and check responses received from the server. However, manually developing test clients is a tedious task requiring people with profound knowledge of the server APIs and significant programming skills.

SUMMARY

Embodiments of the present invention provide a method, system and computer program product for creating a generalized test case. A first computer receives one or more pre-defined equivalence classes, wherein a pre-defined equivalence class comprises of one or more substantially equivalent values. The first computer receives a plurality of messages transmitted between a second computer and a third computer, wherein each message of the plurality of messages has at least one parameter, and each parameter has at least one corresponding value. The first computer determines one or more parameters contained in the plurality of messages has one or more corresponding values that match one or more values of a pre-defined equivalence class. The first computer creates one or more value driven equivalence classes, wherein each value driven equivalence class comprises of one or more parameters, and wherein each of the one or more parameters in each value driven equivalence class has the same corresponding value. The first computer creates a generalized test case, wherein the generalized test case includes at least the one or more value driven equivalence classes.

DETAILED DESCRIPTION

Figure 1:
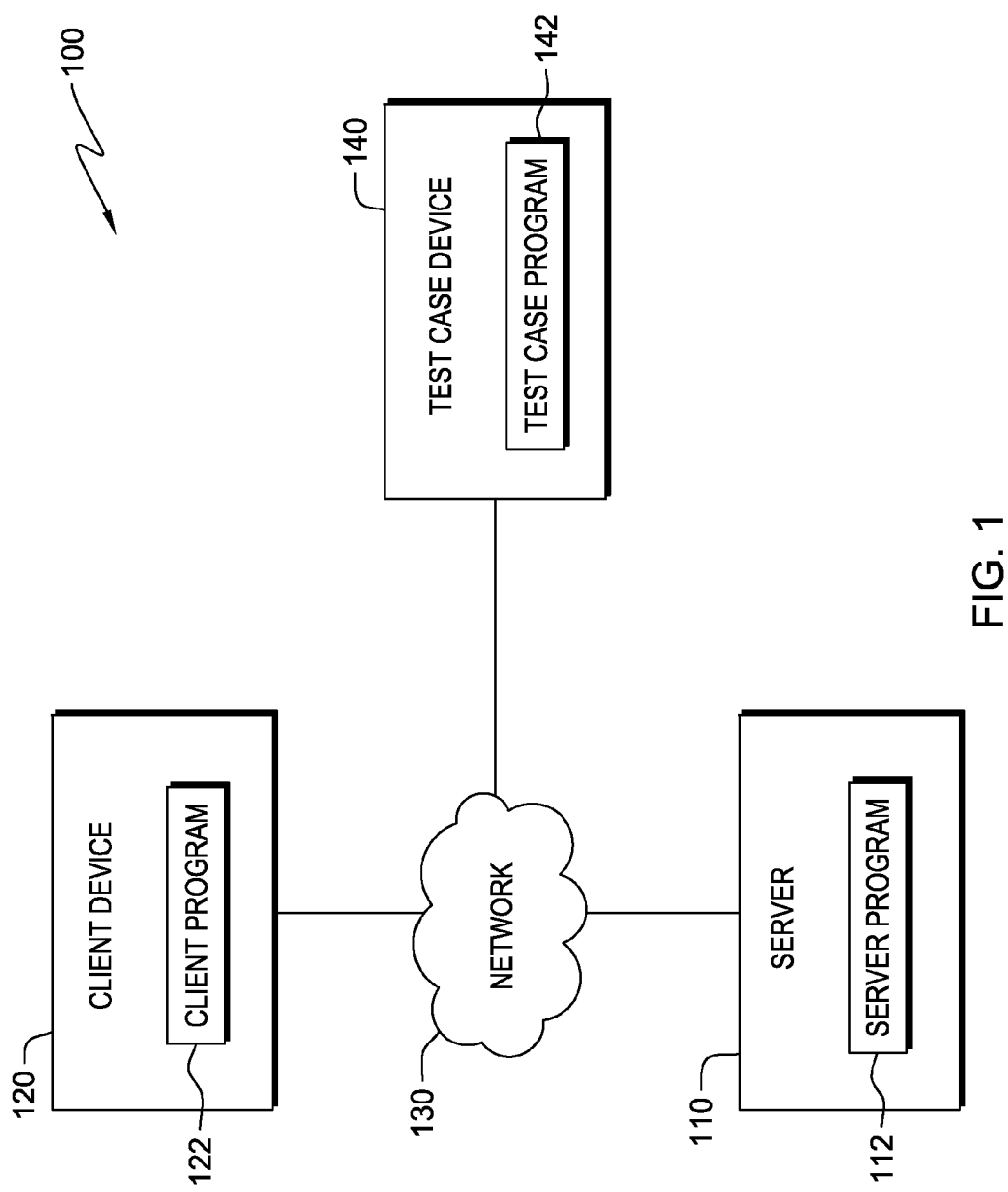
FIG. 1 illustrates a test case creation system for the creation of a generalized test case, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates test case creation system 100, in accordance with an embodiment of the invention. In an exemplary embodiment, test case creation system 100 includes server 110, client device 120 and test case device 140, all interconnected via network 130.

In the exemplary embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between server 110, client device 120, and test case device 140.

Server 110 includes server program 112. In the exemplary embodiment, server 110 may be a desktop computer, a notebook, a laptop computer, a tablet computer, a handheld device, a smart-phone, a thin client, or any other electronic device or computing system capable of receiving and sending data to and from other computing devices, such as client device 120 and test case device 140, via network 130. While server 110 is shown as a single device, in other embodiments, server 110 may be comprised of a cluster or plurality of computing devices, working together or working separately. Server 110 is described in more detail with reference to FIG. 4.

In the exemplary embodiment, server program 112 is software capable of receiving requests from another computing device such as client device 120 via network 130 and transmitting responses to the requests back to the computing device via network 130.

Client device 120 includes client program 122. In the exemplary embodiment, client device 120 may be a desktop computer, a notebook, a laptop computer, a tablet computer, a handheld device, a smart-phone, a thin client, or any other electronic device or computing system capable of receiving and sending data to and from other computing devices, such as server 110 and test case device 140, via network 130. While test case device 140 is shown as a single device, in other embodiments, test case device 140 may be comprised of a cluster or plurality of computing devices, working together or working separately. Test case device 140 is described in more detail with reference to FIG. 4.

In the exemplary embodiment, client program 122 is software capable of transmitting requests to other computing devices, such as server 110, via network 130 and receiving responses to the requests from the other computing devices via network 130.

Test case device 140 includes test case program 142. In the exemplary embodiment, test case device 140 may be a desktop computer, a notebook, a laptop computer, a tablet computer, a handheld device, a smart-phone, a thin client, or any other electronic device or computing system capable of receiving and sending data to and from other computing devices, such as server 110 and client program 120, via network 130. While test case device 140 is shown as a single device, in other embodiments, test case device 140 may be comprised of a cluster or plurality of computing devices, working together or working separately. Test case device 140 is described in more detail with reference to FIG. 4.

In the exemplary embodiment, test case program 142 is software capable of receiving or intercepting messages, such as requests and responses, transmitted between server 110 and client device 120 via network 130. In addition, test case program 142 is capable of analyzing the received or intercepted messages and creating a generalized test case based on the received or intercepted messages. Furthermore, test case program 142 is also capable of receiving input from a user, via a user interface, and transmitting the input to other computing devices, such as server 110 and client device 120 via network 130.

Figure 2:
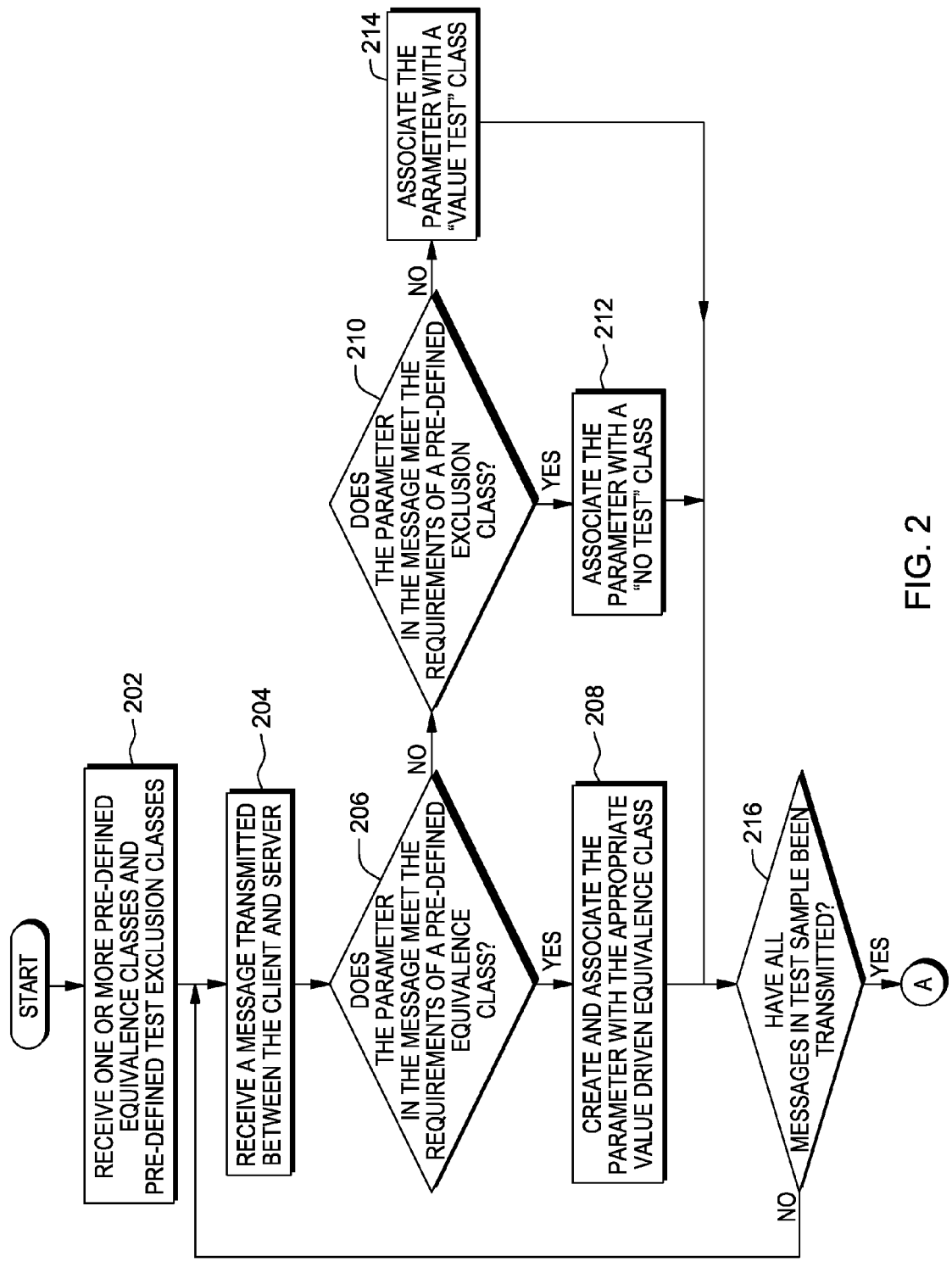
FIGS. 2 and 3 are a flowchart illustrating the operations of a test case program in creating a generalized test case, in accordance with an embodiment of the invention.
Figure 3:
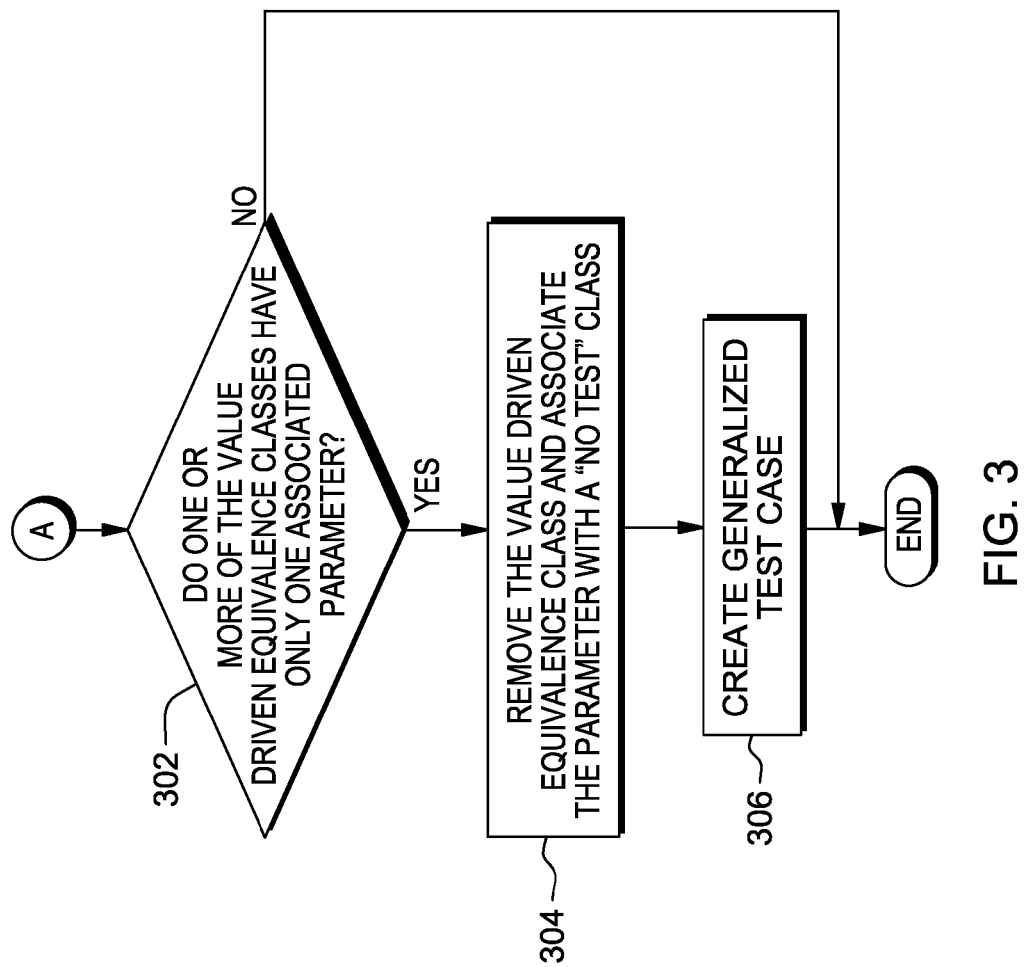

FIG. 2 is a flowchart illustrating the operations of test case program 142 in analyzing messages transmitted between server 110 and client device 120 and creating a generalized test case based on the analyzed messages, in accordance with an exemplary embodiment of the invention. In an exemplary embodiment, test case program 142 receives one or more pre-defined equivalence classes (step 202). In the exemplary embodiment, the one or more pre-defined equivalence classes are formulated by an administrator or programmer based on design time knowledge. With regard to the associated value of a parameter, by design, many server based systems generate values exposing prefixes which are specific for considered resources. For example, for a WebSphere Process Server® (Registered Trademark of IBM), values of a type "TKTID" are associated with all parameters corresponding to process task definition identifiers such as "taskDefID" or the plural form "taskDefIDs". It is important to note that variations of this value, such as TKTID.1 or TKTID.2, may be dynamically created by server 110 in some cases. All variations of the value which contain TKTID as a prefix are considered to be equivalent for the purposes of generalized test case creation. A predefined equivalence class is designed to capture this equivalence. In the exemplary embodiment, a pre-defined equivalence class is a set of parameters exposing a value which is part of a predefined value set. A predefined value set can be defined explicitly as consisting of a specific set of values or implicitly using value constraints. For example, with regard to value constraints, a predefined value set may be defined as any value starting with the prefix TKTID. Using this pre-defined value set for a test sample which includes a parameter which has associated values of TKTID.1 and TKTID.2, and a parameter which has an associated value of TKTID.1, in the exemplary embodiment, both of these parameters may be placed in the same pre-defined equivalence class because they both have associated values which contain the prefix TKTID.

In other embodiments, based on design time knowledge, a pre-defined equivalence class may be defined by an administrator as a set of parameters occurring in specific calls. A parameter is identified uniquely by a "methodID" and a "parameterID". An administrator can then use design time knowledge to group parameters that contain the same or similar identifiers together into pre-defined equivalence classes. For example, since "getTaskDefinitions.output.taskDefIDs" and "createTask.input.taskDefID" contain the same parameterID (taskDefID), an administrator with design time knowledge may choose to place both of these parameters into a pre-defined equivalence class. In addition, in the exemplary embodiment, test case program 142 may also receive one more pre-defined test exclusion classes; however, in other embodiments, test case program 142 may not receive any pre-defined test exclusion classes. In the exemplary embodiment, a pre-defined exclusion class is similar to a pre-defined equivalence class except a pre-defined exclusion class is a set of parameters which the administrator does not want to test. Therefore, an administrator with design time knowledge can create pre-defined exclusion classes so that certain parameters are excluded from testing against the test case.

Test case program 142 then receives a message transmitted between client device 120 and server 110 (step 204). In the exemplary embodiment, the received message is part of a test sample which includes a finite number of messages.

Test case program 142 then determines if the parameter in the message meets the requirements of a pre-defined equivalence class (decision 206). In the exemplary embodiment, the message contains only one parameter; however, in other embodiments, the message may contain multiple parameters, in which case, test case program 142 analyzes each parameter contained in the message independently to determine if the parameter meets the requirements of a pre-defined equivalence class. Referring to the example above, for a pre-defined equivalence class defined in terms of associated values having certain value constraints, such as values containing the prefix "TKTID", test case program 142 determines if the parameter in the received message has an associated value which contains the prefix "TKTID". If test case program 142 determines the parameter in the received message is part of a pre-defined equivalence class (decision 206, "YES" branch), test case program 142 associates the parameter with the appropriate value driven equivalence class (step 208). For example, if test case program 142 determines the parameter is part of a pre-defined equivalence class and the parameter has two associated values, such as TKTID.1 and TKTID.2, as stated above, test case program 142 creates two value driven equivalence classes, one for each associated value, with each containing the parameter. A value driven equivalence class is a set of parameters which have the same associated value. Unlike pre-defined value classes, they cannot be defined in terms of value constraints or prefixes, but rather parameters in a value driven equivalence class must have the same associated value. Referring to the example provided above, one value driven equivalence class may be defined as a set of parameters, where each parameter has an associated value of TKTID.1, and another value driven equivalence class may be defined as a set of parameters, where each parameter has an associated value of TKTID.2.

If test case program 142 determines the parameter in the received message is not part of a pre-defined equivalence class (decision 206, "NO" branch), test case program 142 determines if the parameter meets the requirements of a pre-defined exclusion class (decision 210). If test case program 142 determines the parameter meets the requirements of a pre-defined exclusions class (decision 210, "YES" branch), test case program 142 associates the parameter with a "no test" class (step 212). In the exemplary embodiment, a "no test" class includes parameters that will not be tested. Once test case program 142 creates a generalized test case, the test case is later used by test case program 142 to verify that a program is working properly. For example, once the test case is generated and ready for utilization, test case device 140 takes the place of client device 120 and test case program 142 communicates with server program 112 in the same fashion as client program 122. In the exemplary embodiment, test case program 142 transmits the messages transmitted by client program 122 in the test sample and verifies that the responses by server program 112 match the responses in the test sample. For example, if for a first and second response by server program 112, each response contains a parameter, with both parameters belonging to the same value driven equivalence class, the associated values of both parameters should be equal. If the associated values are not equal then there may be a bug or issue with server program 112. In the exemplary embodiment, values for parameters that are in the "no test" class are not verified by test case program 142.

If test case program 142 determines that the parameter does not meet the requirements of a pre-defined exclusion class (decision 210, "NO" branch), test case program 142 associates the parameter with a "value test" class (step 214). Parameters that are associated with a "value test" class are verified by test case program 142 on an individual basis. For example, once the generalized test case is created, test case program 142 verifies a parameter associated with a "value test" by verifying if the value associated with the parameter matches the value generated during the formation of the test case.

Test case program 142 then determines if all messages in the test sample have been transmitted between server 110 and client device 120 (decision 216). If test program 142 determines that all messages in the test sample have not been transmitted between server 110 and client device 120 (decision 216, "NO" branch), test case program 142 returns back to step 204 and analyzes the next message in the test sample.

If test case program 142 determines that all messages in the test sample have been transmitted between server 110 and client device 120 (decision 216, "YES" branch), test case program 142 determines if any of the value driven equivalence classes formed contain only one associated parameter (decision 302). If test case program 142 determines that no value driven equivalence class formed contains only one associated parameter (decision 302, "NO" branch), test case program 142 creates a generalized test case from the formed value driven equivalence classes and "value test" classes (step 306).

If test case program 142 determines that one or more value driven equivalence classes contains only one associated parameter (decision 302, "YES" branch), test case program 142 removes the one or more value driven equivalence classes and associates the parameters contained in the removed value driven equivalence classes with a "no test" class (step 304). Test case program 142 then creates a generalized test case from the remaining value driven equivalence classes and "value test" classes (step 306).

Once the generalized test case has been created, test case device 140 takes the place of client device 140 and the test sample is re-executed. Test case program 142 then verifies that the server response is accurate by way of comparison to the generalized test case. Values for any parameters which fall in a "value test" class are verified by comparison to the value recorded for the "value test" class in the generalized test case. If the value matches the recorded value then the server response is verified and accurate. Values for a parameter which falls in a value driven equivalence class is verified by comparison to values for other members of the value driven equivalence class. For example, if a first parameter, belonging to a first value driven equivalence class, is received with a corresponding value A and then a second parameter, also belonging to the first value driven equivalence class, is received with a corresponding value A, the values of the two parameters are compared to determine if they match. If they do match, the server response is verified. In addition, for verification of a member of a value driven equivalence class, the value recorded in the generalized test case is not used for verification purposes. Values of members of value driven equivalence classes are instead compared to other values corresponding to the value driven equivalence class received during the same iteration of the test sample. In other words, the value A of the first parameter is compared to the value of the second parameter in order to verify correctness only if both parameters are received during the same iteration of the test sample. In previous or subsequent iterations of the test sample, the first parameter may have different associated values, however, the values of each value driven equivalence class should match for each iteration.

In other embodiments, machine learning may be used to create a generalized test case from multiple test samples. In this embodiment, a computing device, such as test case device 140 may receive pre-defined equivalence classes or may create a generalized test case without any pre-defined equivalence classes. If pre-defined equivalence classes are used, test case program 142 processes multiple test samples and creates value driven equivalence classes, "value test" classes, and "no test" classes in a similar manner as described above. If pre-defined equivalence classes are not used, test case program 142 processes multiple test samples, with each distinct parameter initially being designated as a "value test" class. Therefore, test case program 142 processes the first test sample, initially designating each parameter with a unique associated value, as "value test" class.

Within the first test sample, each parameter is additionally associated with its own value driven equivalence class containing the parameter itself and all other parameters exposing the same value. For any subsequent test samples, test classification, as well as the associated value driven equivalence class, are re-computed for every parameter. A parameter is changed to "equiv test" class if the parameter was a "value test" in the previous test sample and the parameter value in the current test sample is different from the one in the previous test sample. Otherwise, the test class remains the same. In addition, the value driven class associated with the parameter is cleared of the parameters exposing a value which is different from the parameter's value in the current test sample. After the test samples and related computations have been completed, each parameter classified as "equiv test" with a value driven equivalence class containing only one parameter is re-classified as a "no test".

For example, if test sample 1 and test sample 2 are as follows:

Test Sample 1

| Method ID | Input/Output | Parameter ID | Value |
|---|---|---|---|
| Method 1 | Input | P1 | aVal1 |
|  | Output | P2 | aVal1 |
| Method 2 | Input | P3 | aVal1 |
|  | Output | P4 | aVal1 |

Test Sample 2

| Method ID | Input/Output | Parameter ID | Value |
|---|---|---|---|
| Method 1 | Input | P1 | aVal1 |
|  | Output | P2 | aVal2 |
| Method 2 | Input | P3 | aVal2 |
|  | Output | P4 | aVal3 |

Test case program 142 executes test sample 1 and initially classifies each parameter as a "value test" class while also creating a value driven equivalence class for each parameter in the first test sample. Therefore, test case program 142 classifies each parameter as a "value test" and also creates a value driven equivalence class which contains all four parameters since they all expose the same value in the first test sample.

Test case program 142 then executes the second test sample. Test case program 142 classifies the first parameter, P1, as a value test since it exposes the same value in the second test sample as the first test sample, and also creates a first value driven equivalence class containing the first parameter. Test case program 142 classifies the second parameter as "equiv test" since the value exposed by the parameter, P2, in the second test sample is different from the value exposed in the first test sample. Test case program 142 creates a second value driven equivalence class containing the second parameter. Test case program 142 also classifies the third parameter, P3, as "equiv test" and includes it in the second equivalence class since the value exposed by the third parameter in the second test sample is the same as the value exposed by the second parameter. Test case program 142 classifies the fourth parameter as "equiv test" and creates a third value driven equivalence class containing the fourth parameter. After execution of the test samples, test case program 142 determines if any of the value driven equivalence classes contain only a single parameter. In this example, the first and fourth value driven equivalence classes contain only a single parameter so they are removed. The first parameter remains a "value test" while the fourth parameter is re-classified as a "no test".

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

Figure 4:
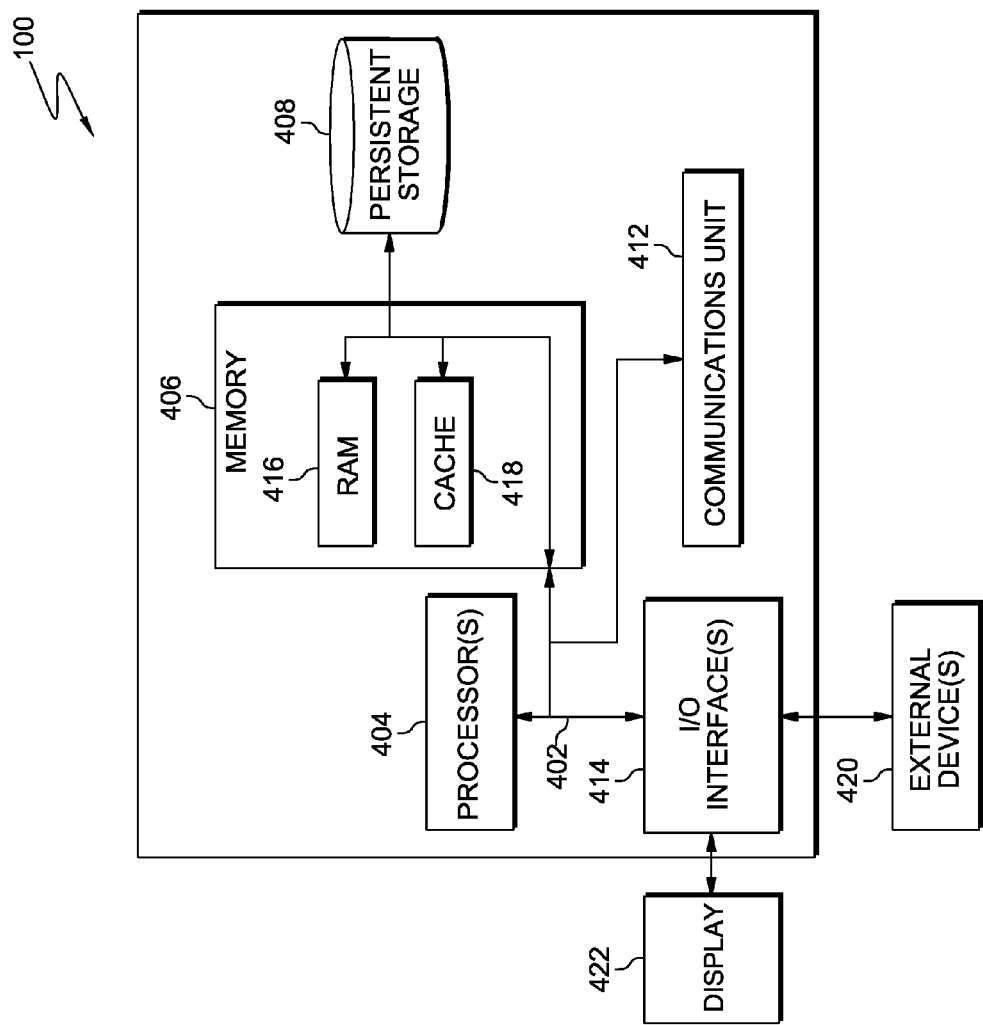
FIG. 4 is a block diagram depicting the hardware components of the test case creation system of FIG. 1, in accordance with an embodiment of the invention.

FIG. 4 depicts a block diagram of components of server 110, client device 120, and test case device 140, in accordance with an illustrative embodiment. It should be appreciated that FIG. 4 provides only an illustration of one implementation and does not imply any limitations with regard to the environment in which different embodiments may be implemented. Many modifications to the depicted environment may be made.

Server 110, client device 120, and test case device 140 include communications fabric 402, which provides communications between computer processor(s) 404, memory 406, persistent storage 408, communications unit 412, and input/output (I/O) interface(s) 414.

Memory 406 and persistent storage 408 are examples of computer-readable tangible storage devices and media. Memory 406 may be, for example, one or more random access memories (RAM) 416, cache 418, or any other suitable volatile or non-volatile storage device.

The programs server program 112 in server 110; client program 122 in client device 120; and test case program 142 in test case device 140 are stored in persistent storage 408 for execution by one or more of the respective computer processors 404 via one or more memories of memory 406. In the embodiment illustrated in FIG. 4, persistent storage 408 includes flash memory. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 412, in these examples, provides for communications with other data processing systems or devices. In these examples, communications unit 412 includes one or more network interface cards. Communications unit 412 may provide communications through the use of either or both physical and wireless communications links. Programs server program 112 in server 110; client program 122 in client device 120; and test case program 142 in test case device 140 may be downloaded to persistent storage 408 through communications unit 412.

I/O interface(s) 414 allows for input and output of data with other devices that may be connected to server 110, client device 120, and test case device 140. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., the programs server program 112 in server 110; client program 122 in client device 120; and test case program 142 in test case device 140, can be stored on such portable computer-readable storage media and can be loaded onto persistent storage 408 via I/O interface(s) 414. I/O interface(s) may also connect to display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a generalized test case, comprising the steps of:
    a first computer receiving one or more pre-defined equivalence classes, wherein a pre-defined equivalence class comprises of one or more substantially equivalent values;
    the first computer receiving a plurality of messages transmitted between a second computer and a third computer, wherein each message of the plurality of messages has at least one parameter and each parameter has at least one corresponding value;
    the first computer determining one or more parameters contained in the plurality of messages has one or more corresponding values that match one or more values of a pre-defined equivalence class;
    the first computer creating one or more value driven equivalence classes, wherein each value driven equivalence class comprises of one or more parameters and, wherein each of the one or more parameters in each value driven equivalence class has the same corresponding value; and
    the first computer creating a generalized test case, wherein the generalized test case includes at least the one or more value driven equivalence classes.

2. The method of claim 1, wherein a first value driven equivalence class of the one or more value driven equivalence classes contains a first parameter of the one or more parameters in the one or more value driven equivalence classes, further comprising the steps of:
    the first computer determining that no other parameter from the plurality of messages has an associated value equal to an associated value of the first parameter;
    the first computer removing the first value driven equivalence class from the generalized test case; and
    the first computer classifying the first parameter as a no test class.

3. The method of claim 1, further comprising the steps of:
    the first computer receiving one or more pre-defined exclusion classes, wherein a pre-defined exclusion class comprises of one or more substantially equivalent values;
    the first computer determining a second parameter contained in the plurality of messages has one or more corresponding values that match one or more values of a pre-defined exclusion class; and
    the first computer classifying the second parameter as a no test class.

4. The method of claim 3, further comprising the steps of:
- the first computer determining a third parameter contained in the plurality of messages has one or more corresponding values that do not match one or more values of the one or more pre-defined equivalence classes;
- the first computer determining the one or more corresponding values of the third parameter do not match the one or more values of the one or more pre-defined exclusion classes;
- the first computer classifying the third parameter as a first value test class; and
- the first computer creating the generalized test case to include at least the one or more value driven equivalence classes and the first value test class.

5. A computer program product for creating a generalized test case, the computer program product comprising:
- one or more computer-readable storage devices and program instructions stored on at least one of the one or more computer-readable storage devices, the program instructions comprising:
- program instructions to receive one or more pre-defined equivalence classes, wherein a pre-defined equivalence class comprises of one or more substantially equivalent values;
- program instructions to receive a plurality of messages transmitted between a second computer and a third computer, wherein each message of the plurality of messages has at least one parameter and each parameter has at least one corresponding value;
- program instructions to determine one or more parameters contained in the plurality of messages has one or more corresponding values that match one or more values of a pre-defined equivalence class; program instructions to create one or more value driven equivalence classes, wherein each value driven equivalence class comprises of one or more parameters and, wherein each of the one or more parameters in each value driven equivalence class has the same corresponding value; and
- program instructions to create a generalized test case, wherein the generalized test case includes at least the one or more value driven equivalence classes.

6. The computer program product of claim 5, wherein a first value driven equivalence class of the one or more value driven equivalence classes contains a first parameter of the one or more parameters in the one or more value driven equivalence classes, further comprising:
- program instructions to determine that no other parameter from the plurality of messages has an associated value equal to an associated value of the first parameter;
- program instructions to remove the first value driven equivalence class from the generalized test case; and
- program instructions to classify the first parameter as a no test class.

7. The computer program product of claim 5, further comprising:
- program instructions to receive one or more pre-defined exclusion classes, wherein a pre-defined exclusion class comprises of one or more substantially equivalent values;
- program instructions to determine a second parameter contained in the plurality of messages has one or more corresponding values that match one or more values of a pre-defined exclusion class; and
- program instructions to classify the second parameter as a no test class.

8. The computer program product of claim 7, further comprising:
- program instructions to determine a third parameter contained in the plurality of messages has one or more corresponding values that do not match one or more values of the one or more pre-defined equivalence classes;
- program instructions to determine the one or more corresponding values of the third parameter do not match the one or more values of the one or more pre-defined exclusion classes;
- program instructions to classify the third parameter as a first value test class; and
- program instructions to create the generalized test case to include at least the one or more value driven equivalence classes and the first value test class.

9. A computer system for creating a generalized test case, the computer system comprising:
- one or more processors, one or more computer-readable memories, one or more computer-readable tangible storage devices, and program instructions stored on at least one of the one or more storage devices for execution by at least one of the one or more processors via at least one of the one or more memories, the program instructions comprising:
- program instructions to receive one or more pre-defined equivalence classes, wherein a pre-defined equivalence class comprises of one or more substantially equivalent values;
- program instructions to receive a plurality of messages transmitted between a second computer and a third computer, wherein each message of the plurality of messages has at least one parameter and each parameter has at least one corresponding value;
- program instructions to determine one or more parameters contained in the plurality of messages has one or more corresponding values that match one or more values of a pre-defined equivalence class;
- program instructions to create one or more value driven equivalence classes, wherein each value driven equivalence class comprises of one or more parameters and wherein each of the one or more parameters in each value driven equivalence class has the same corresponding value; and
- program instructions to create a generalized test case, wherein the generalized test case includes at least the one or more value driven equivalence classes.

10. The computer system of claim 9, wherein a first value driven equivalence class of the one or more value driven equivalence classes contains a first parameter of the one or more parameters in the one or more value driven equivalence classes, further comprising:
- program instructions to determine that no other parameter from the plurality of messages has an associated value equal to an associated value of the first parameter;
- program instructions to remove the first value driven equivalence class from the generalized test case; and
- program instructions to classify the first parameter as a no test class.

11. The computer system of claim 9, further comprising:
- program instructions to receive one or more pre-defined exclusion classes, wherein a pre-defined exclusion class comprises of one or more substantially equivalent values;
- program instructions to determine a second parameter contained in the plurality of messages has one or more corresponding values that match one or more values of a pre-defined exclusion class; and program instructions to classify the second parameter as a no test class.

12. The computer system of claim 11, further comprising:

program instructions to determine a third parameter contained in the plurality of messages has one or more corresponding values that do not match one or more values of the one or more pre-defined equivalence classes;

program instructions to determine the one or more corresponding values of the third parameter do not match the one or more values of the one or more pre-defined exclusion classes;

program instructions to classify the third parameter as a first value test class; and program instructions to create the generalized test case to include at least the one or more value driven equivalence classes and the first value test class.

* * * * *